A. B. LANDIS.
CHANGE SPEED TRANSMISSION.
APPLICATION FILED DEC. 6, 1915.

1,353,355.

Patented Sept. 21, 1920.
5 SHEETS—SHEET 1.

INVENTOR
Abraham B. Landis

WITNESSES
Harry L. Landis
A. Frank Landis

A. B. LANDIS.
CHANGE SPEED TRANSMISSION.
APPLICATION FILED DEC. 6, 1915.
1,353,355.
Patented Sept. 21, 1920.
5 SHEETS—SHEET 2.
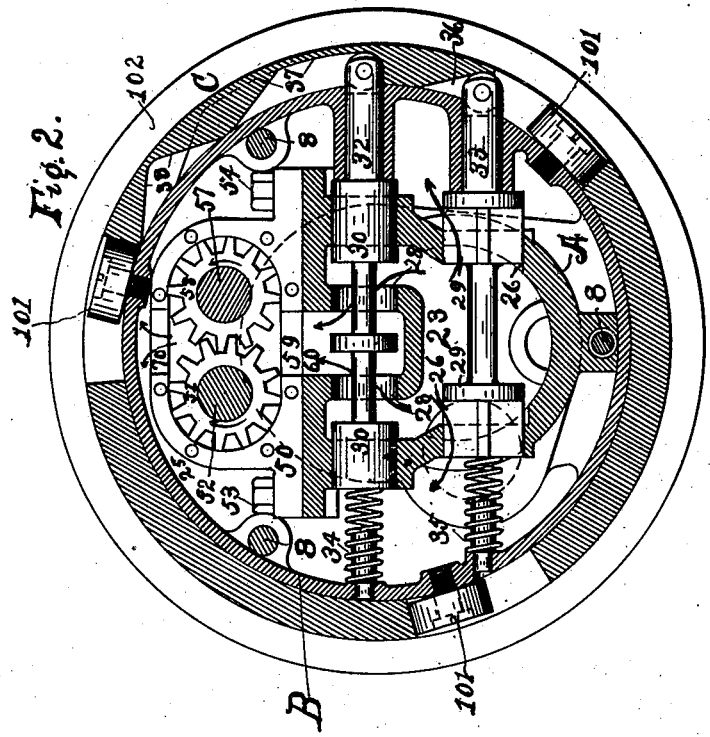
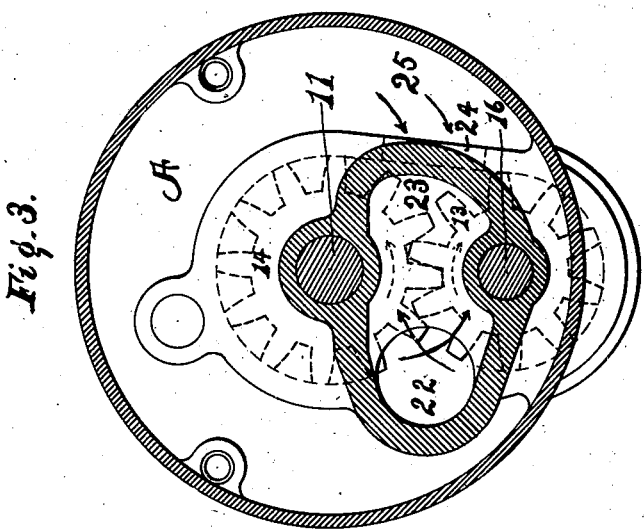
INVENTOR
Abraham B. Landis
WITNESSES

A. B. LANDIS.
CHANGE SPEED TRANSMISSION.
APPLICATION FILED DEC. 6, 1915.

1,353,355.

Patented Sept. 21, 1920.
5 SHEETS—SHEET 3.

INVENTOR
Abraham B. Landis

WITNESSES

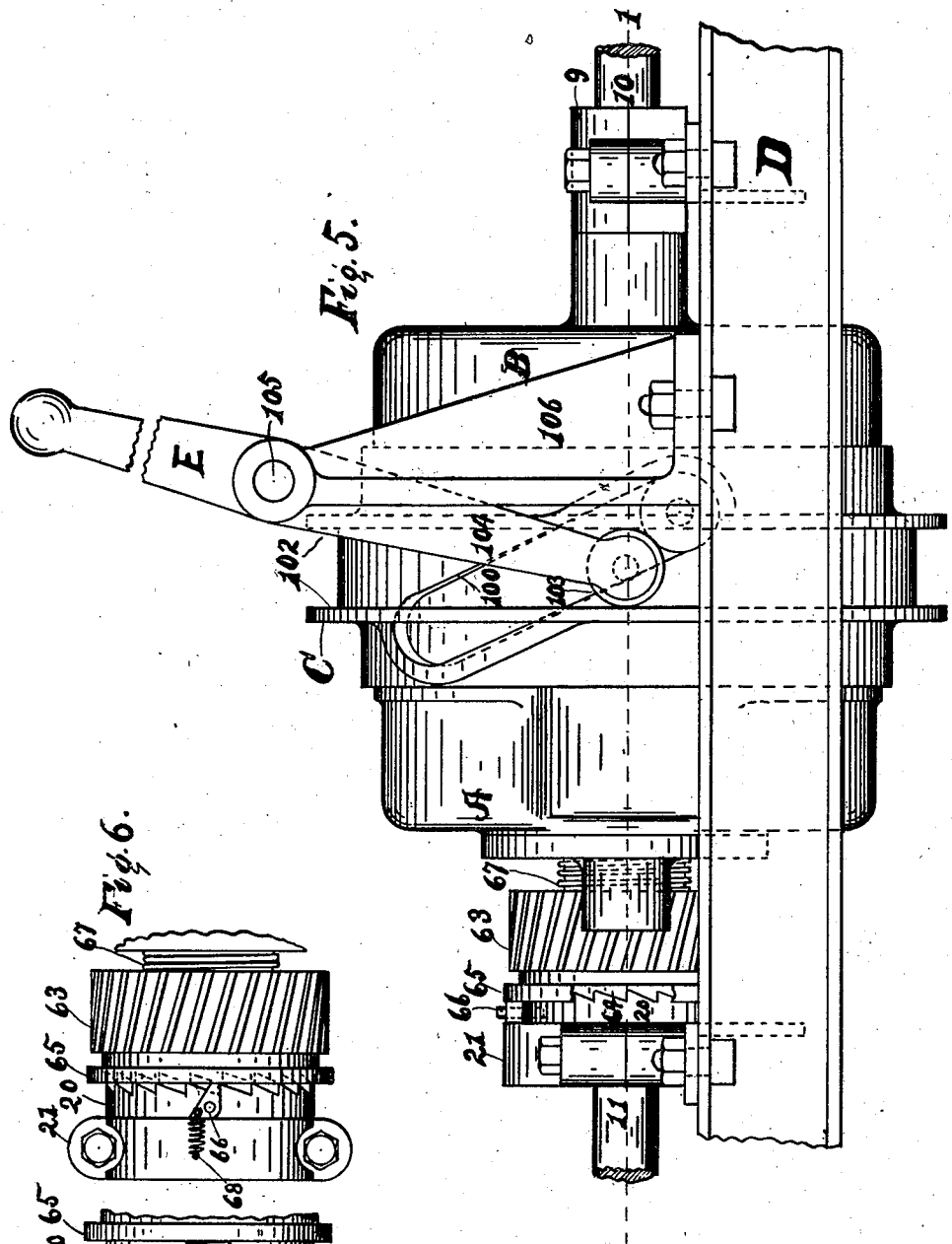

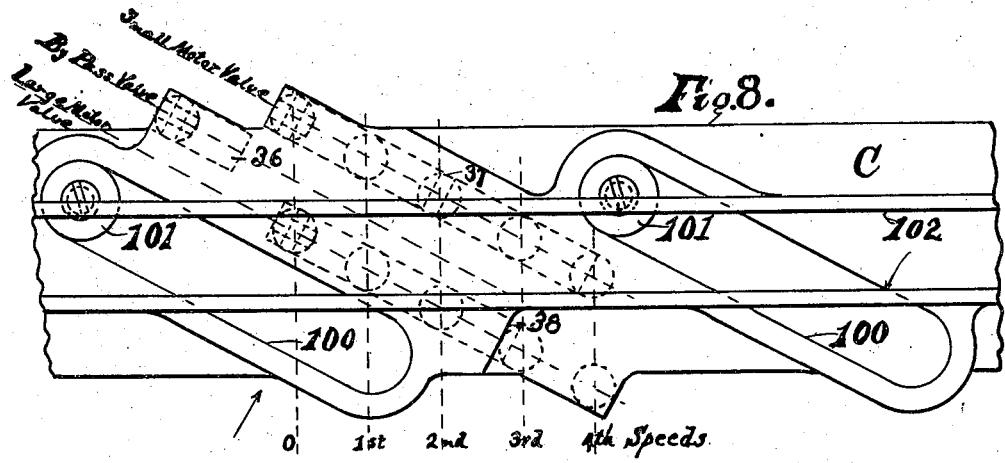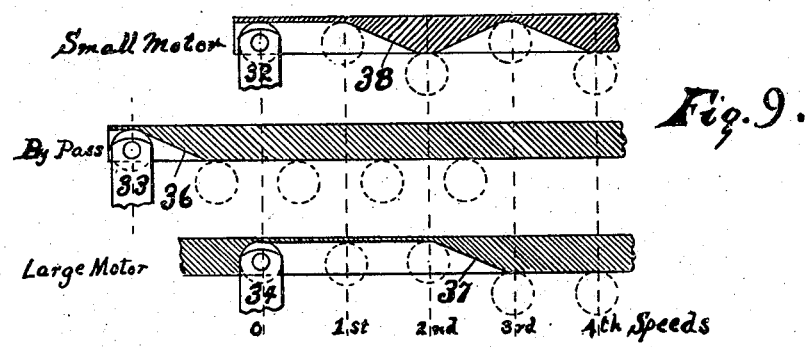

UNITED STATES PATENT OFFICE.

ABRAHAM B. LANDIS, OF ENFIELD, PENNSYLVANIA.

CHANGE-SPEED TRANSMISSION.

1,353,355.   Specification of Letters Patent.   Patented Sept. 21, 1920.

Application filed December 6, 1915. Serial No. 65,417.

*To all whom it may concern:*

Be it known that I, ABRAHAM B. LANDIS, a citizen of the United States, residing at Enfield, in the county of Montgomery and State of Pennsylvania, have invented certain new and useful Improvements in Change-Speed Transmission, of which the following is a specification.

My said invention relates to a change speed transmission designed more especially for use in motor cars but is equally well adapted for other service where change speed is required. It consists of an improved construction whereby the change of speed is effected by the movement of a single element which is accomplished with the greatest ease without the attention to or need of operating any other part. This single movement effects a change from one speed to another without clash or shock, which is so very objectionable with the ordinary means of changing speeds, and it is positive in action. The said invention is on the hydraulic principle or type with the difference from the usual hydraulic transmission, that at the highest speed it works non-hydraulically although the load is sustained against the fluid used, but at that speed the fluid is at rest, and as the speed is decreased from step to step, the fluid flow is increased which reaches its highest movement when the driven element becomes inactive or stops moving, while the driving element may continue its motion. By this method for a motor car, the change speed mechanism or hydraulic features will be used very little of the time, all as will be hereinafter more fully described and claimed.

Figure 1:
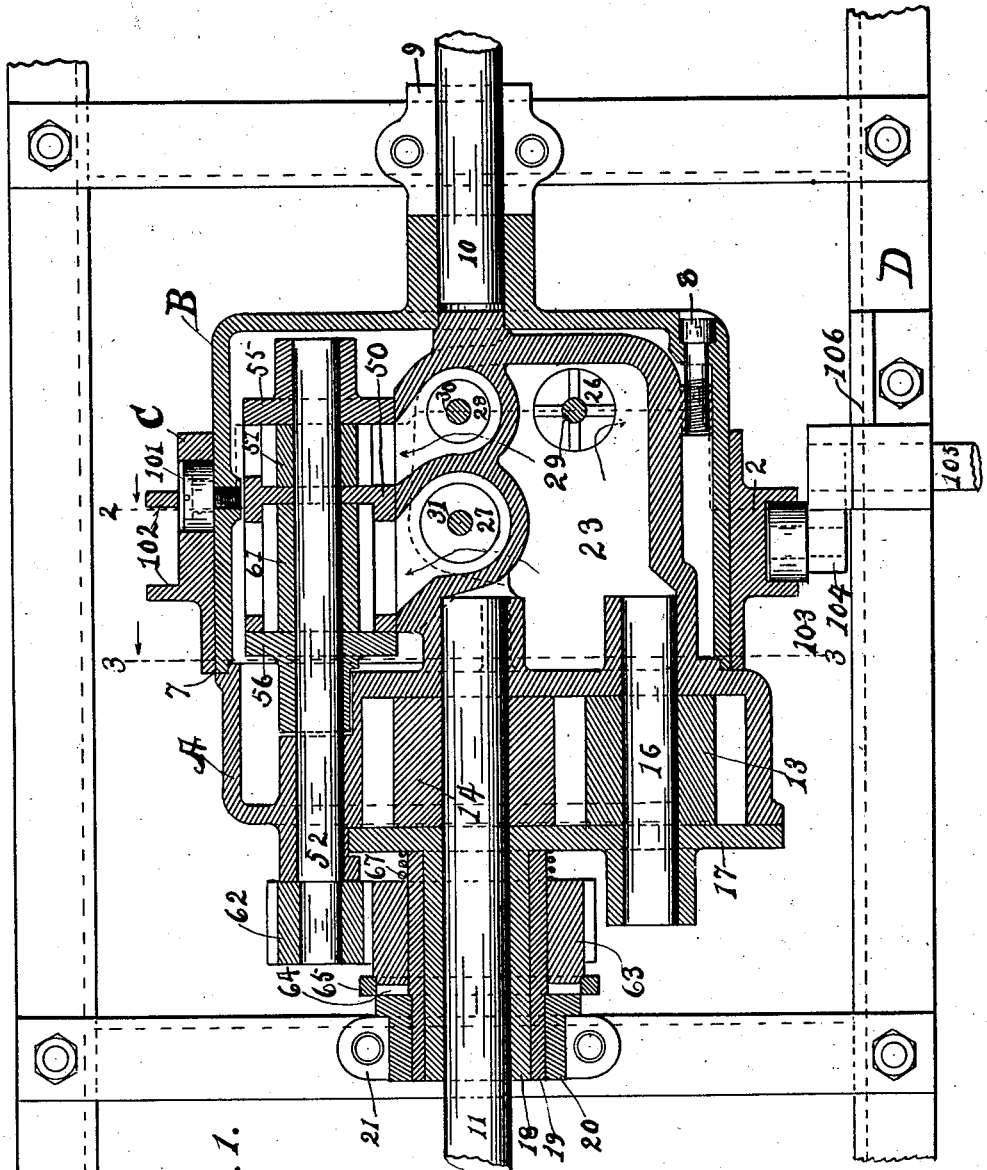
Figure 4:
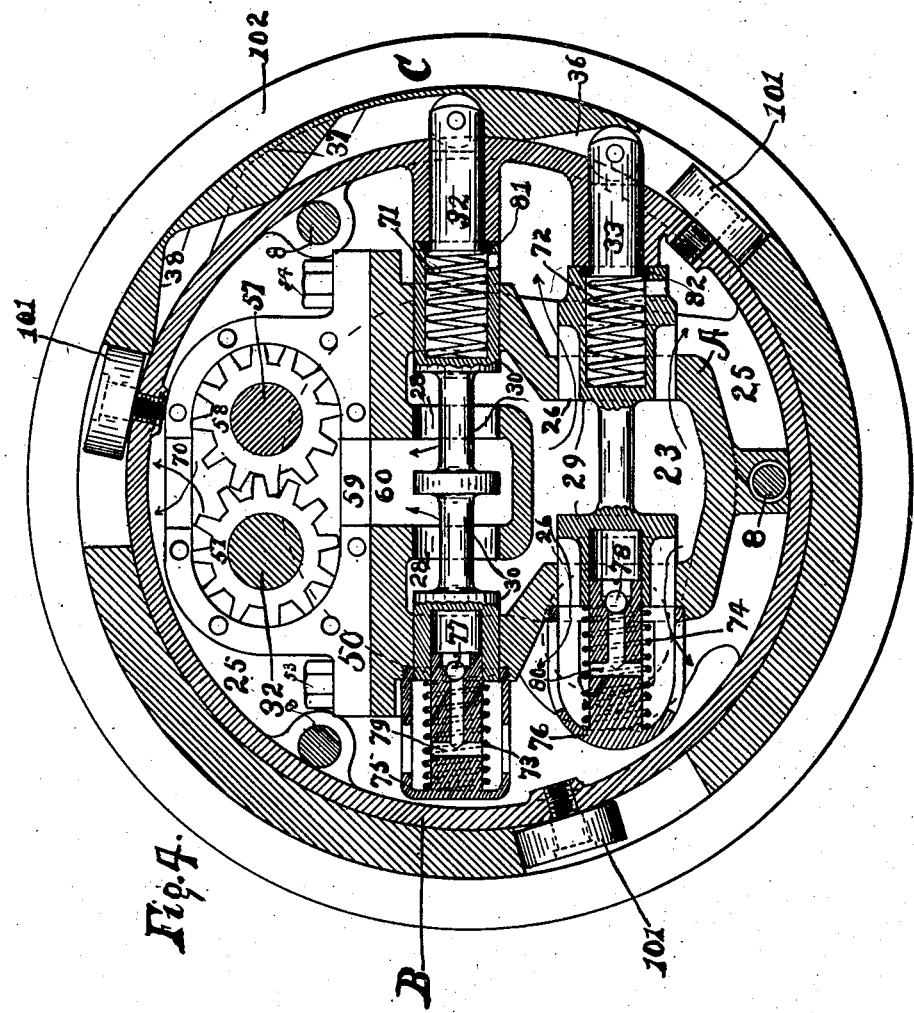

Referring to the accompanying drawings on which like reference characters indicate like or same parts, Figure 1 is a horizontal sectional view through the transmission casing showing the parts therein, taken on line 1—1 in Fig. 5, Fig. 2 a vertical cross section of the casing on line 2—2 of Fig. 1, looking in direction of the arrow, Fig. 3 a vertical cross section of the same on line 3—3 of Fig. 1, Fig. 4 is an enlarged scale of same section as Fig. 2 with additions to the valve mechanism, Fig. 5 is a side view of the exterior of the transmission and its application as on a motor car, Fig. 6 a detail of a gearing arrangement as will be described, Fig. 7 another detail of same gearing, Fig. 8 a development of arrangement of cams by which the change speed mechanism is operated, and Fig. 9 a section of said cams.

In said drawings the portions marked A and B represent two parts of the casing of the gearing which are secured together by bolts 8, 8, 8 and are joined at 7 (see Figs. 1 and 2); C, a ring encircling said casing for controlling the parts within; D, part of an automobile chassis to which the gear is secured and E the change speed operating lever in easy reach of the operator as will be readily understood and will require no special description except as they shall be referred to in describing other parts of the device.

The gear comprises a driving shaft 10, journaled in a bearing 9, which couples with the engine or any source of power by any approved manner, and a driven shaft 11 from which power is transmitted to the driving mechanism of a vehicle or other machinery in the usual manner.

Said driving shaft is secured by any suitable means to the casing part B, and the driven shaft 11 enters the other end in casing part A, said two shafts being in alinement with each other. Said casing part A has a chamber and is arranged for a common rotary gear pump containing two meshing gears 13 and 14 forming said pump. Gear 14 being secured to the driven shaft 11 and the gear 13 secured to shaft 16 journaled in casing part A on one side of said gear and on the other side in a bearing in a pump cap 17. Shaft 11 is also journaled on one side of gear 14 in casing part A and on the other side in pump cap 17. Said pump cap 17 is secured to said casing part A by screws, (not shown) forming a fluid tight closure. Said cap 17 has a hub 18 forming a journal for the casing in bushing 19, the interior of said hub forming the bearing for shaft 11 as stated. Said bushing 19 is secured in a clutch bushing 20 which is firmly secured in a clamp support to which reference will be made later on.

The pump chamber, (see Fig. 3) has an opening 22 from same which opens into chamber 23 of casing part A (see Figs. 1, 2, 3, and 4). There is another opening 24 on the opposite side of the pump chamber from chamber 25 in casing part A. This opening forms a fluid inlet to the pump while 22 is its outlet as will be noted by the arrows. Chamber 23 receives the fluid from the pump through the opening 22. From chamber 23 are outlets 26, 27, and 28 which are closed by valves as needed the operation of which will later be described. These outlets are formed in the casing part A.

No. 50 is another pump or motor casing of the rotary gear type which is made double for reasons which I will later describe. Said motor casing is secured to the casing part A by bolts 53 and 54 forming a fluid tight joint between them. The motor chambers have caps 55 and 56 for closing same, secured by screws not shown, making a fluid tight closure of same. Bearings are formed in said caps for the shaft 52 also for another shaft 57 for gear 58. Said motors have inlet openings 59 connecting with openings 60 forming fluid passages from valve openings 27 and 28 and on the opposite side of said motor casing are outlets 70 opening into chamber 25.

The fluid outlets 26, 27, and 28 from chamber 23 are opened and closed by valves 29, 30, and 31; and are operated by plungers 32 and 33 (as well as 34 not shown except in Fig. 9 which operates valve 31) having anti friction rollers on their outer ends which engage with cams 36, 37, and 38 on the inner surface of ring C, the rotation of which by its cams depresses the plungers and closes the valves in proper order or opens them by means of springs 34 and 35 when the cams move off said plungers.

Valve 29 is double and opens the chamber 23 to chamber 25 at two openings. This construction being preferable for two reasons, one to balance the action of said valve and the other to increase the area of opening for the free flow of the fluid. The same is also true of the valves 30 and 31 and for the same reason named.

The ring C encircling the casing B, is arranged with three diagonal slots 100, two only of which are shown in the development of said ring in Fig. 8. These slots are equidistant from each other around the periphery of the ring and register and engage with three anti friction rollers 101 secured to the outer surface of casing B. Two flanges 102 forming a shouldered groove around the periphery of said ring C, are arranged for the engagement of a roller 103, which is mounted on the end of an arm 104, which arm is secured to a shaft 105, said shaft is journaled in a stand or bracket 106, which is secured to the chassis frame D. Operating lever E is secured to this shaft 105 by which motion to same is given. By moving said lever E, ring C is moved longitudinally on the casing B and due to the angular slots 100 it is turned upon said casing in a spiral path. In the spiral path are formed the cams which operate the plungers which in turn operate the valves as stated and required. Fig. 9 shows these spiral paths in section through the cams showing the exact operation of the same.

The shaft 52 extends through the double motor and is secured to gears 51 and 61 of said motors and extends through the casing part A and has secured on its end a pinion 62. Said pinion meshes with a gear 63 which is normally loosely mounted upon sleeve 19. This gear has a clutch face with teeth of ratchet form 64 on one side of same and is adapted to engage a similar clutch face on the clutch bushing 20 which is firmly secured in the clamp support 21. A ring 65 is tightly secured around the clutch portion of gear 63 and is flush with the face of the clutch teeth. This ring forms a bearing for holding said clutch out of engagement by its engagement with dog 66 while said gear loosely revolves upon bushing 19 in the direction which due to the ratchet teeth will cause them to disengage, as will be seen, or in other words in the direction of movement of the driving element which is to the right or "clock-wise" as it is termed when viewing it from the driving end.

When however the motors are moved by the flow of fluid from the pump, this gear is made to move in the reverse direction causing it to engage with the stationary clutch bushing 20, and which movement by the friction of the ring against the dog 66 causes it to tilt as shown in Fig. 7, and by the spring 67 causes the clutch to engage holding the gear stationary against this direction of movement, causing the power from the motors to be exerted favoring the motion of the driving element. The spiral or angular teeth on gear 63 and pinion 62 are for the purpose of insuring full depth engagement of the clutches which the angles will cause, due to the slight end thrust produced by it, and also to produce a more quiet running gearing. A spring 68 attached to the stationary portion 21 couples with dog 66 to cause same to hold said dog upright, and keep gear 63 through its ring 65 out of engagement with said stationary clutch and also to prevent rasping therewith.

Fig. 4 shows a cross section of the transmission which is the same as Fig. 2 with some exceptions and is on enlarged scale to better illustrate it. It will be noted that Fig. 2 is somewhat simpler but is equally as efficient as Fig. 4, and that in this arrangement the valves are slightly different. Instead of a positive movement of the valves by the cam ring C they are yieldably connected and the valves are detained in their movement after the cam has depressed the plungers.

I will describe the arrangement and its purpose. Only two of the valves, as in Fig. 2 are shown, there being three of them, and they are alike. The end of the valves upon which plungers 32 and 33 engage, have chambers for the reception of springs 71 and 72. These springs are under a tension and are so held by the rings 81 and 82. The plunger enters this ring and bears upon the spring as the size of spring is such so as to bear on the ring as well as the plunger when said plunger is pressed against it by the cam. The opposite end of these valves also have chambers.

Plungers on caps 75 and 76 engage with these chambers, said caps are screwed into recesses around the valve opening. Cap 76 being on the by pass valve 29 has large openings around its side to allow the flow of fluid from the chamber 23 into chamber 25. Cap 75 also has small opening in it. These plungers have perforations 79 and 80 with a branch perforation to the end of same. Recesses in said perforations on the end of said plungers, receive ball valves 77 and 78. A small pin across the recess is provided for retaining the ball in position with room to allow the ball to open and close the perforation. These plungers and chambers form "dashpots."

Springs 73 and 74 hold valves against the plungers 32 and 33 and said plungers against the cams and act to open the valves 29 and 30. Springs 71 and 72 have a tension on them held by the rings 81 and 82 which is in excess of the tension of springs 73 and 74 when these are compressed. The chambers with which the plungers engage are normally filled with the fluid used in the operation of the transmission, as it is all immersed in the fluid, which when there is no motion to the driven element the valves are in exact position as shown, all being open, and all the valve chambers with the ring plungers filled with fluid. When the ring C is moved the cams on same act to depress the plungers 32 and 33 and owing to the ball valves 77 and 78, the fluid cannot escape through the valve opening and therefore the springs 71 and 72 are compressed to the extent of the movement of plungers 32 and 33 and the valves 29 and 30 do not instantly move. Sufficient leakage is arranged for around these plungers for the fluid to escape at such speed as may be deemed best for the purpose of a gradual close and an easy change to the next speed of the driven element.

When the cams pass off plungers 32 and 33 springs 73 and 74 force the valves 29 and 30 back, opening the fluid passage ways and the ball valves drop from their seat and allow the chambers to rapidly fill with fluid. Therefore as will be seen the valves 29 and 30 will close slowly and open quickly.

The object of this arrangement is to avoid the necessity, as in case of Fig. 2 of moving the lever E slowly, so as to avoid a sudden acceleration of driven element in changing from one speed to another, and also to make it adaptable to a selective change of speed without a sudden acceleration, as by this means these valves all closing slowly when passing over or omitting a speed, as in selective operation, the cam plungers 32 and 33 will recede again before their valves have time to close due to the dashpot, or if not wanted to close will not close at all after the speed has been selected and lever position has been placed. This also allows of a quick movement of the lever E to its various positions and the acceleration of the speed of the driven element will still be with ease.

This gives the difference in the arrangement of Fig. 2 and Fig. 4. Fig. 2 is somewhat simpler and cheaper to produce and when handled carefully will work equally as well as Fig. 4.

Having described the construction of the invention I will now describe its operation.

As in a motor car when the engine is started there is and should be no motion, so also is there none in this device. The casing of the gearing transmission is secured with positive motion to the engine and revolves with the same. Starting the engine starts the movement of fluid through the pump to chamber 23 at full capacity, due to the pump gear being secured to the driven shaft 11 which is not moving. In the stopped position of the driven element, the valve 29, which is of large capacity, is full open, as well also as the valves to the motors. This large opening permits of the free flow of fluid without causing the driven shaft 11 to move. To start the car or driven element the first operation or step is to move to the first position for "first speed." This is accomplished by moving lever E and rotating ring C on the casing B to first step or "first speed" (as shown in Fig. 9) when valve 29 will close and stop the flow of fluid through said valve from chamber 23 and take its course through the motors. The capacity of the two motors being only ¾ of that of the pump, the speed of the driven shaft will then move only ¼ as fast as the driver, since the motors will absolutely only allow a fixed amount of fluid to pass through them due to it being geared to a stationary gear which gives a fixed ratio of speed to that of the driver. Valve 29 having been closed remains closed until the gear again comes to no motion to the driven element when it again opens. The next step is to move ring C by same means as before, to 2nd position or "2nd speed" (see Fig. 9) then the valve 30 through which fluid is supplied to small motor is closed leaving fluid to pass only through the large motor. This small motor being ¼ of the capacity of the pump therefore increases the speed ¼ more and is the second speed. The large large motor is double the capacity of small one.

The next step is to move ring C to 3rd position or "3rd speed," (Fig. 9) when valve 30 to small motor will again be opened allowing fluid to pass through it and valve 31 closing passage to the large motor is closed. This then shuts off ¾ of the capacity of the pump and increases speed to ¾ or the "3rd speed" since this then only leaves ¼ of the capacity of the pump, as at stopped position of the driven element to pass through the motor. The next step is to move ring C to 4th position or "4th speed" which closes the opening to small motor through means of valve 30 and all opening now being closed no fluid is allowed to pass out of chamber 23, stopping the flow of fluid from the pump and driving the driven element as fast as its driver. It is obvious that step by step the opposite movement of lever E will in the same manner decrease the speed until a stopped position is reached.

It will be clear that by adding another motor on the same shaft 52 whose capacity will equal one third more than the two motors combined, with an additional valve and cam for operating it, the three motors combined if made of a size to equal ⅛ the capacity of the pump, a change speed gearing can be made having eight distinct speeds. Four speeds however are sufficient for all practical purposes in the use of motor cars.

Having now described my said invention which will enable those skilled in the art to construct and make the same, what I claim as new and desire to secure by Letters Patent is:

1. A change speed transmission comprising a driving element and a driven element, said driving element comprising a revoluble casing, said casing containing a fluid pump, said pump connected with said driven element, one or more motors within said casing and valves between said pump and motors by which the speed of said driven element is controlled, substantially as specified.

2. A change speed transmission comprising a driving element comprising a revoluble casing, a fluid pump on said casing, said pump connected with a driven element, one or more motors in said driving element and valves which control the flow of fluid from said pump for the purpose of changing the speed of the driven element, substantially as specified.

3. A change speed transmission comprising a revoluble casing, said casing having a pump secured thereto, said pump connected to a driven element, one or more motors within said casing and valves by which the flow of fluid from said pump is controlled, whereby the speed of the driven element is controlled, said pump motors exerting their force upon a stationary element, substantially as set forth.

4. A change speed transmission comprising a revoluble casing secured to a driving element, a pump secured with said casing and connected to a driven element, one or more motors within said casing, valves for controlling the fluid flow from said pump to said motors by which the speed is changed progressively or selectively, substantially as specified.

5. A change speed transmission comprising a revoluble casing, containing a pump and motors, valves between said pump and motors, said pump connected with a driven motor, said motors connected to a single shaft, said shaft projecting without said revoluble casing, a gear on said shaft connecting with a stationary gear mounted concentric with said driven element upon which the motion of said motors acts favoring the rotation of said casing, substantially as set forth.

6. A change speed transmission comprising driving and driven elements, a pump secured to the driving element, said pump connected to a driven element, one or more motors on said driving element, means for containing fluid in said driving element and means for controlling the flow of fluid from said pump to said motors to control the speed of the driven element, substantially as specified.

7. A change speed transmission comprising a revoluble casing, said casing having a pump and one or more motors secured therein, fluid chambers in said casing, one for the fluid under pressure between said pump and motors another for the reception of free fluid, said pump motors arranged so that their connection with a stationary gear and by valves between said pump and motors controls the flow of fluid from said pump thereby controlling the speed of the driven element, substantially as specified.

8. A change speed transmission comprising a driving element, a revoluble casing, said casing containing a fluid pump and one or more fluid motors, valves controlling the fluid to the different motors, a ring encircling said casing by which the movement of said valves is controlled, substantially as set forth.

9. A change speed transmission comprising driving and driven elements, said driving element consisting of a revoluble casing, said casing containing a fluid pump and one or more motors, fluid chambers, valves controlling the flow of fluid to any of said motors for various speed or for cutting the fluid from all motors by which a direct drive or highest speed is attained, making the gear inactive, substantially as set forth.

10. A change speed transmission comprising driving and driven elements, said driving element consisting of a revoluble casing, said casing containing a fluid pump, one or more motors, valves to shut off the fluid flow to any or all the motors, and a ring encircling the said casing for the control of said valves, said ring having means to rotate same independent of the rotation of said casing by longitudinally sliding it and means for sliding said ring, substantially as specified.

11. A change speed transmission comprising a revoluble casing containing a fluid pump and one or more motors, valves for controlling the fluid between said pump and motors, plungers in the periphery of said casing engaging said valves, a ring encircling said casing, said ring having cams engaging said plungers, means for rotating said ring on said casing, by a longitudinal motion thereof and means for moving said ring, substantially as set forth.

12. A change speed transmission comprising a revoluble casing containing a fluid pump, one or more motors, fluid chambers within said casing, valves controlling the fluid between said pump and motors, said motors attached to one common shaft, said shaft projecting outside the casing, a gear on the end of said shaft engaging a stationary gear concentric with said casing, substantially as set forth.

13. A change speed transmission comprising a revoluble casing, said casing containing a fluid pump, one or more motors and valves controlling the flow of fluid between said pump and motors, said motors connected to a shaft, said shaft projecting from the casing, a gear on said shaft engaging a stationary gear concentric with said casing, and means for operating said valves consisting of a ring encircling said casing by a longitudinal movement of same thereon and means for moving said ring, substantially as set forth.

14. A change speed transmission comprising a revoluble casing containing a fluid pump, one or more motors, said motors connected to a shaft, said shaft projecting from said casing, a gear on same engaging a stationary gear concentric with said casing, said stationary gear being held against rotation by a clutch, enabling same to revolve in the direction of said casing when the fluid flow is cut off by means of valves from said motors as in the case of high speed, thus avoiding the running mesh of said gears when the gear is inactive, substantially as specified.

15. A change speed transmission comprising a revoluble casing containing a fluid pump and motors, means for controlling the fluid to said motors by valves, said motors connected to a single shaft having a gear upon its end engaging with a gear held stationary by a clutch acting in one direction, by which when the fluid to the motors is stopped said motors cease moving and said stationary gear becomes revoluble in the direction of the motion of the driven element and opposite to the holding action of the clutch, substantially as set forth.

16. A change speed transmission comprising a revoluble casing, said casing containing a fluid pump, one or more motors, valves controlling the fluid from said pump to said motors, said motors connected to a common shaft with a gear on its outer end engaging a stationary gear concentric with said casing, means for making said stationary gear revoluble when the pump motors are stopped by fluid disconnection as in high speed, avoiding the meshing rotating action between them, substantially as set forth.

17. A change speed transmission comprising a revoluble casing containing a pump, one or more motors, means for controlling the flow of fluid from said pump to said motors, said motors all connected to one shaft, said shaft engaging a stationary gear concentric with said casing by means of a pinion on its end, means for allowing said stationary gear to rotate when the fluid is cut off from said motors, stopping same, a ring encircling said casing which actuates the valves controlling said fluid, said ring having means by which it rotates on said casing to move the valves by a longitudinal motion thereof on the casing, and means to move said ring, substantially as set forth.

18. A change speed transmission comprising a revoluble casing, said casing containing a fluid pump, said pump actuated by the rotation of said casing, one or more motors in said casing, fluid connections between said pump and motors, means for controlling the flow of fluid from said pump by which the driven element connecting with said pump is caused to change its speed, said motors arranged to proportionally allow the fluid to circulate to create different speeds, motion or power of said motors being exerted upon a stationary gear concentric with said revoluble casing thereby causing motion in the direction of said revoluble casing, substantially as specified.

19. A change speed transmission comprising a revoluble casing, a pump and one or more motors within said casing, said pump made active by the difference of capacity of said pump and motors, a fluid connection with controlling means for controlling the flow of fluid from said pump to said motors, means by which the power of the motors is exerted upon a stationary gear concentric with said revoluble casing, means by which said stationary gear is allowed to revolve when the fluid to the motors is shut off, means for actuating the said valves by a moving ring encircling said casing and means for moving said ring, substantially as specified.

20. A change speed transmission comprising driving and driven elements, a fluid pump, fluid motors, valves between said pump and motors, means by which when said valves are closed the driving and driven elements coincide in speed and the fluid is at rest, means by which the opening of one or more of said valves allows a loss of motion to the driven element in proportion to their size, the power of said motors being exerted against a stationary gear concentric with said elements exerting its force in the direction of their motion by means of a pinion secured on the motor shaft meshing with said stationary gear, substantially as specified.

21. A change speed transmission comprising a revoluble casing having fluid compartments, a fluid pump, one or more motors of varying capacity calibrated to produce different speed as they are brought into action, each of said motors provided with a fluid controlling valve, a by pass valve between said fluid compartments by which the driven element is brought to a stop while the driving element continues its motion, said motors connected to a common shaft and having a pinion gearing with a stationary gear to receive the power produced by said motors and exerting same in the direction of said driven element, substantially as specified.

22. A speed change transmission comprising a gearing actuated by a fluid pump and motors by which when at the highest speed the said pump is inactive as a pump but active as a support to the load, the pump becoming active when the fluid by the pressure on said pump is allowed to pass to one of said motors by means of valves and the speed changed in ratio to its capacity with said pump, the power of said motor being exerted upon a stationary gearing concentric with the revoluble parts applying its power in the direction of motion of the driven element, substantially as specified.

23. A change speed transmission comprising a revoluble casing containing a fluid pump and motors, said motors attached to a shaft connecting with a stationary gear concentric with said casing said gear arranged to revolve in the direction of motion of said casing when the flow of fluid is cut off from said motors by means of valves, substantially as specified.

24. A change speed transmission comprising a revoluble casing, a fluid pump and one or more motors in said casing, valves controlling the flow of fluid from said pump to said motors, a ring encircling said casing arranged with cams for operating said valves, said ring having diagonal slots engaging with roller on said casing by which said ring is caused to rotate by a longitudinal movement of same upon said casing and means to move said ring, substantially as specified.

25. A change speed transmission comprising a revoluble casing, said casing having a fluid pump and motors therein, means to control the fluid from said pump to said motors, a ring encircling said casing by which said means of fluid control are operated, means for imparting motion to said ring upon said casing independent of the rotation of said casing, while said casing rotates and means for operating said ring, substantially as set forth.

26. A change speed transmission comprising a revoluble casing containing a fluid pump and motor, valves for controlling the fluid from said pump to said motor, means by which the power of said motor is exerted upon a stationary means to aid to rotate said casing, a ring for controlling said valves encircling said casing, means for operating said ring upon said casing in a rotary direction independent of the rotation thereof, and means for moving said ring longitudinally upon said casing, substantially as set forth.

27. A change speed transmission comprising a revoluble casing containing fluid compartments, a fluid pump connecting the driving and driven elements, means by which the diminution of the flow of fluid through said pump will cause the speed of the driven element to be increased and when the flow is entirely stopped the driven element runs as fast as the driving element, valves for controlling the flow of fluid through said motors, a cam ring controlling said valves encircling said casing and means for moving said ring, substantially as specified.

28. A change speed transmission comprising driving and driven rotating elements, a fluid pump on one of said elements, a gear of said pump connecting with the other element, means by which when the driven element is running at same speed as the driving element the pump is inactive, comprising motors on the element containing the pump, valves by which the flow of fluid is regulated and allowed to flow at different ratio capacities to that of the pump through said motors giving reduced and different ratio speeds of the driven element and means by which the fluid of the said pump will not pass through said motors allowing the said driven element to stop, as specified.

29. A speed change transmission comprising a driving and a driven element, a fluid pump on one of said elements, a gear of said pump secured to the other element, a fluid motor on same element with the pump, valves between said pump and said motors by which the fluid flows at various speeds to change the speed of the driven element, means to operate said valves, means with said valves to allow the same to close slowly so as to make change of one speed to another gradually with ease and without shock, substantially as set forth.

30. A change speed transmission comprising a driving and a driven element, a fluid pump secured with one of said elements, a gear of said pump secured on the other element, fluid motors on same element with the pump, valves between said pump and said motors by which the fluid flows at various speeds to change the speed of the driven element, means to operate said valves while the element revolves, means to cause a gradual closing of said valves so as to make the change from one speed to another with ease and without shock, substantially as set forth.

31. A change speed transmission comprising a revoluble casing on a driving element, a fluid pump contained in said casing, a gear of said pump secured to a driven element, motors in said casing, valves between said pumps and said motors, a ring encircling said casing by the movement of which said valves are operated to control the amount of fluid from said pump through said motors, said valves arranged with means to permit a gradual closure in order to change from one speed to another with ease and without shock, substantially as set forth.

32. A change speed transmission comprising driving and driven elements, one of said elements having a casing, a fluid pump and one or more motors, valves between said pump and motors to control the flow of fluid from said pump thereby effecting various speeds of the driven element, said valves controlled by a ring upon said casing by means of cams and a movement of said ring upon the casing, said valves arranged with means by which they will close gradually, to make the change from one speed to another with ease and without shock, substantially as set forth.

33. A change speed transmission having driving and driven rotary elements comprising a casing and a fluid pump on one of said elements, fluid motors in said casing, valves between said pump and motors by which the flow of fluid is controlled from said pump, said motors attached to a common shaft, said shaft by means of a gear connecting with a stationary gear concentric with said elements, said valves operated by a ring on said casing, said valves arranged with means to prevent sudden closure to cause the change of speed to be gradual, with ease and without shock, substantially as set forth.

In testimony whereof I affix my signature in the presence of two witnesses.

ABRAHAM B. LANDIS.

Witnesses:
  ELMER MILLER,
  VICTOR PAUL.